US012785434B2

(12) United States Patent
Liu et al.

(10) Patent No.: US 12,785,434 B2
(45) Date of Patent: Nov. 3, 2026

(54) BATTERY PACK PARALLEL CIRCUIT AND DESIGN METHOD THEREFOR, BATTERY, AND CHARGE/DISCHARGE SYSTEM

(71) Applicant: SHENZHEN KSTAR NEW ENERGY COMPANY LIMITED, Shenzhen (CN)

(72) Inventors: Chengyu Liu, Shenzhen (CN); Guanqing Guo, Shenzhen (CN); Jianliang Huang, Shenzhen (CN); Quangeng Li, Shenzhen (CN)

(73) Assignee: SHENZHEN KSTAR NEW ENERGY COMPANY LIMITED, Shenzhen (CN)

( * ) Notice: Subject to any disclaimer, the term of this patent is extended or adjusted under 35 U.S.C. 154(b) by 809 days.

(21) Appl. No.: 18/139,957

(22) Filed: Apr. 27, 2023

(65) Prior Publication Data

US 2024/0079896 A1 Mar. 7, 2024

(30) Foreign Application Priority Data

Apr. 29, 2022 (CN) ........................ 202210483558.4

(51) Int. Cl.
*H02J 7/00* (2026.01)
*H01M 10/46* (2006.01)
(Continued)

(52) U.S. Cl.
CPC ............ *H02J 7/933* (2026.01); *H01M 10/46* (2013.01); *H02J 7/342* (2020.01); *H02J 7/54* (2026.01); *H02J 7/751* (2026.01)

(58) Field of Classification Search
CPC .... H02J 7/933; H02J 7/34; H02J 7/342; H02J 7/54; H02J 7/751; H01M 10/46
USPC ........................................................ 320/126
See application file for complete search history.

(56) References Cited

U.S. PATENT DOCUMENTS

2004/0189250 A1 9/2004 Nishida
2011/0279085 A1* 11/2011 Shigemizu .......... H01M 10/441 320/117

(Continued)

FOREIGN PATENT DOCUMENTS

CN 102710000 A 10/2012
CN 105896663 A 8/2016

(Continued)

OTHER PUBLICATIONS

European Office Action for Application 23170603.7, dated Oct. 4, 2023, 4 pgs., European Patent Office, Germany.

(Continued)

*Primary Examiner* — Nathaniel R Pelton
(74) *Attorney, Agent, or Firm* — McDonald Hopkins LLC

(57) ABSTRACT

A battery pack parallel circuit is connected to a charge/discharge apparatus. The circuit includes a battery module formed by multiple battery packs connected in parallel, and battery packs located at two ends of the battery module are a first end battery pack and a second end battery pack respectively. A positive terminal of the first end battery pack is configured as a positive terminal of the circuit and connected to a positive connection terminal of the charge/discharge apparatus. A negative terminal of the second end battery pack is configured as a negative terminal of the circuit and connected to a negative connection terminal of the charge/discharge apparatus. The connection mode between the battery pack parallel circuit and the charge/discharge apparatus is modified to enable the current to flow in/out from the positive terminal of the parallel battery packs and flow out/in from the farthest negative terminal on the diagonal.

16 Claims, 4 Drawing Sheets

(51) Int. Cl.

| | |
|---|---|
| ***H02J 7/34*** | (2006.01) |
| ***H02J 7/54*** | (2026.01) |
| ***H02J 7/70*** | (2026.01) |
| ***H02J 7/90*** | (2026.01) |

(56) References Cited

U.S. PATENT DOCUMENTS

| | | | | |
|---|---|---|---|---|
| 2018/0026311 | A1 | 1/2018 | Hinterberger et al. | |
| 2021/0083488 | A1 | 3/2021 | Hirose et al. | |
| 2022/0109309 | A1* | 4/2022 | Liu ........................... | H02J 7/40 |

FOREIGN PATENT DOCUMENTS

| | | | |
|---|---|---|---|
| CN | 206541879 | U | 10/2017 |
| CN | 107316971 | A | 11/2017 |
| CN | 111009949 | A | 4/2020 |
| CN | 112636417 | A | 4/2021 |
| CN | 214755628 | U | 11/2021 |
| CN | 113872258 | A | 12/2021 |
| JP | H07327323 | A | 12/1995 |

OTHER PUBLICATIONS

State Intellectual Property Office of People's Republic of China, Notification of First Office Action for Application No. 2022104835584, report issue date Aug. 10, 2024, China.

State Intellectual Property Office of People's Republic of China, Notification of Second Office Action for Application No. 2022104835584, report issue date Mar. 15, 2025, China.

* cited by examiner

BATTERY PACK PARALLEL CIRCUIT AND DESIGN METHOD THEREFOR, BATTERY, AND CHARGE/DISCHARGE SYSTEM

CROSS REFERENCE TO THE RELATED APPLICATIONS

This application is based upon and claims priority to Chinese Patent Application No. 202210483558.4, filed on Apr. 29, 2022, the entire contents of which are incorporated herein by reference.

TECHNICAL FIELD

The present disclosure relates to the field of batteries, and in particular to a battery pack parallel circuit and a design method therefor, a battery, and a charge/discharge system.

BACKGROUND

In prior battery pack connection schemes, generally, battery packs are connected in parallel to solve the problem that the whole battery is affected by cell fault of a single battery pack. However, the parallel connection mode in the prior art cannot achieve parallel current sharing, which affects the use and service life of the battery.

SUMMARY

The main purpose of the present disclosure is to propose a battery pack parallel circuit and a design method therefor, a battery, and a charge/discharge system, to solve the problem that the prior art cannot achieve parallel equalization of flow of the battery pack.

To achieve the above purpose, the present disclosure provides a battery pack parallel circuit. The circuit is connected to a charge/discharge apparatus, the circuit includes a battery module formed by a plurality of battery packs connected in parallel, and battery packs located at two ends of the battery module are a first end battery pack and a second end battery pack respectively; and a positive terminal of the first end battery pack is configured as a positive terminal of the circuit and connected to a positive connection terminal of the charge/discharge apparatus, and a negative terminal of the second end battery pack is configured as a negative terminal of the circuit and connected to a negative connection terminal of the charge/discharge apparatus.

Optionally, the battery module includes at least one resistor pair formed by a positive resistor and a negative resistor; the positive resistor has an equivalent resistance of a connection impedance between positive charge terminals of two adjacent battery packs, and the negative resistor has an equivalent resistance of a connection impedance between negative charge terminals of the two adjacent battery packs; and a resistance ratio of the positive resistor to the negative resistor in the resistor pair satisfies a battery pack current sharing condition.

Optionally, if cell internal resistances of all of the plurality of battery packs connected in parallel are identical, a first resistance ratio of the positive resistor to the negative resistor in the resistor pair satisfies:

$$(N-i)R_{i+}=iR_{i-}$$

N is the number of the battery packs, i is a serial number of the resistor pair, a serial number of a resistor pair closest to the positive connection terminal of the charge/discharge apparatus is 1, $R_{i+}$ is the positive resistor, and $R_{i-}$ is the negative resistor.

Optionally, if a cell internal resistance of at least one battery pack is different from cell internal resistances of the other battery packs, the positive resistor and the negative resistor in the resistor pair satisfy a second resistance ratio, and the second resistance ratio is calculated based on Kirchhoff's voltage theorem and the cell internal resistance of each of the battery packs.

Optionally, the charge/discharge apparatus comprises a charger, an inverter, or a converter.

Further, to achieve the above purpose, the present disclosure further provides a design method for a battery pack parallel circuit. The method is applied to the battery pack parallel circuit as described above, and the method includes:

obtaining a battery pack parameter of each battery pack and a battery pack current sharing condition; and calculating resistances of a positive resistor and a negative resistor in each resistor pair based on each battery pack parameter, to enable that the resistances satisfy the battery pack current sharing condition, where the positive resistor has an equivalent resistance of a connection impedance between positive charge terminals of two adjacent battery packs, and the negative resistor has an equivalent resistance of a connection impedance between negative charge terminals of the two adjacent battery packs.

Optionally, the step of calculating the resistances of the positive resistor and the negative resistor in each resistor pair based on each battery pack parameter may include:

calculating a resistance ratio of the positive resistor to the negative resistor in each resistor pair based on each battery pack parameter; and determining the resistances of the positive resistor and the negative resistor based on the resistance ratio.

Optionally, the step of calculating the resistance ratio of the positive resistor to the negative resistor in each resistor pair based on each battery pack parameter may include:

obtaining a cell internal resistance of each battery pack from each battery pack parameter;

determining whether cell internal resistances of all the battery packs are identical; and if the cell internal resistances of all the battery packs are identical, determining that the resistance ratio of the positive resistor to the negative resistor in each resistor pair satisfies:

$$(N-i)R_{i+}=iR_{i-}$$

N is the number of the battery packs, i is a serial number of the resistor pair, a serial number of a resistor pair closest to a positive connection terminal of the charge/discharge apparatus is 1, $R_{i+}$ is the positive resistor, and $R_{i-}$ is the negative resistor.

Optionally, after the step of determining whether the cell internal resistances of all the battery packs are identical, the design method method may further include:

obtaining the cell internal resistance of each battery pack if a cell internal resistance of at least one battery pack is different from cell internal resistances of the other battery packs; and calculating the resistance ratio of the positive resistor to the negative resistor in each resistor pair based on Kirchhoffs voltage theorem and the cell internal resistance of each battery pack.

Optionally, the battery pack current sharing condition comprises a resistance ratio of the positive resistor to the negative resistor, wherein the resistance ratio was calculated and stored in advance in different cases.

Further, to achieve the above purpose, the present disclosure further provides a battery. The battery includes a shell and the battery pack parallel circuit as described above.

Further, to achieve the above purpose, the present disclosure further provides a charge/discharge system. The system includes a charge/discharge apparatus and the battery pack parallel circuit as described above.

Optionally, further comprising a shell, wherein the shell forms a battery with the battery pack parallel circuit, and the battery is connected to the charge/discharge apparatus.

The present disclosure provides a battery pack parallel circuit and a design method therefor, a battery, and a charge/discharge system. The circuit is connected to a charge/discharge apparatus, the circuit includes a battery module formed by a plurality of battery packs connected in parallel, and battery packs located at two ends of the battery module are a first end battery pack and a second end battery pack respectively; and a positive terminal of the first end battery pack is configured as a positive terminal of the circuit and connected to a positive connection terminal of the charge/discharge apparatus, and a negative terminal of the second end battery pack is configured as a negative terminal of the circuit and connected to a negative connection terminal of the charge/discharge apparatus. The connection mode to the charge/discharge apparatus is modified to enable the current to flow in/out from the positive terminal of the parallel battery packs and flow out/in from the farthest negative terminal on the diagonal, to adjust the parameters of the impedance devices with different current directions, such that parallel current sharing of the battery packs can be achieved by adjusting the impedance devices in the circuit.

BRIEF DESCRIPTION OF THE DRAWINGS

To describe the technical solutions in the embodiments of the present application or in the prior art more clearly, the following briefly describes the accompanying drawings required for describing the embodiments or the prior art. Apparently, the accompanying drawings in the following description show some embodiments of the present application, and those of ordinary skill in the art may still derive other drawings from these accompanying drawings without creative efforts.

DETAILED DESCRIPTION OF THE EMBODIMENTS

Understandably, the specific embodiments described herein are merely intended to explain the present disclosure but not to limit the present disclosure.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by those of ordinary skill in the art based on the embodiments of the present disclosure without creative efforts should fall within the protection scope of the present disclosure.

It should be noted that all the directional indications (such as upper, lower, left, right, front, and rear) in the embodiments of the present disclosure are merely used to explain relative position relationships, motion situations, and the like of the components in a specific gesture (as shown in the figures). If the specific gesture changes, the directional indication also changes accordingly.

Moreover, the terms such as "first" and "second" used herein are only for the purpose of description and are not intended to indicate or imply relative importance, or implicitly indicate the number of the indicated technical features. Therefore, a feature limited by "first" or "second" may explicitly or implicitly include at least one such feature. Further, the technical solutions of the embodiments may be combined with each other on the basis that the combination is implementable by those of ordinary skill in the art. In case a combination of the technical solutions is contradictory or infeasible, such a combination is deemed inexistent and not falling within the protection scope of the present disclosure.

Figure 1:
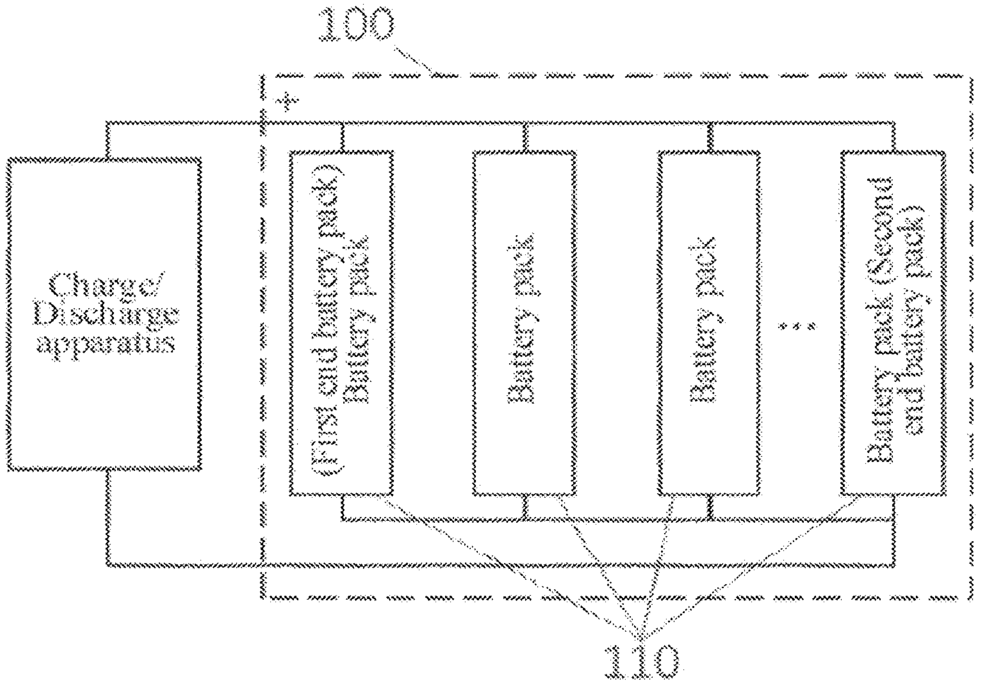
FIG. 1 is a functional module diagram of an embodiment of a battery pack parallel circuit according to the present disclosure.

The present disclosure provides a battery pack parallel circuit applied in a charge/discharge system. FIG. 1 is a functional module diagram of an embodiment of the battery pack parallel circuit according to the present disclosure. In this embodiment, the circuit is connected to a charge/discharge apparatus, and the circuit includes battery module 100 formed by a plurality of battery packs 110 connected in parallel. Battery packs 110 located at two ends of the battery module 100 are a first end battery pack and a second end battery pack respectively. A positive terminal of the first end battery pack is configured as a positive terminal of the circuit and connected to a positive connection terminal of the charge/discharge apparatus, and a negative terminal of the second end battery pack is configured as a negative terminal of the circuit and connected to a negative connection terminal of the charge/discharge apparatus.

It should be understood that the charge/discharge apparatus is any apparatus that can be connected to the battery, including but not limited to a charger, an inverter, a converter, or the like.

The magnitude of the charge/discharge current between the battery packs connected in parallel is affected by the impedance of the battery pack parallel network, and the impedance mainly includes an external impedance and an internal impedance. The internal impedance includes the cell internal resistance, the impedance of the connection wire for connecting the cells in series, and the impedance of the connection wire for connecting to a battery management system (BMS). In general, the cell internal resistances are basically identical when a same batch of cells are used, and in the ideal state, the cell internal resistances of the battery packs are identical. Due to the same wiring method and production process of the battery packs, in the ideal state, the impedance of the connection wire for connecting the battery packs in series is identical to the impedance of the connection wire for connecting to the BMS. The external impedance includes the connection terminal impedance between positive and negative connection terminals of the charge/discharge apparatus and the parallel battery packs. In general, the connection terminal impedances are basically identical when the type and production process of the connection terminals are identical. Therefore, during actual application, the greatest impact on current sharing is the wire impedance between the charge/discharge apparatus and the battery packs and the wire impedance between the battery packs and the electromagnetic environment. In this embodiment of this application, the same internal impedance means that the internal impedances are identical within a specific error range.

Figure 2:
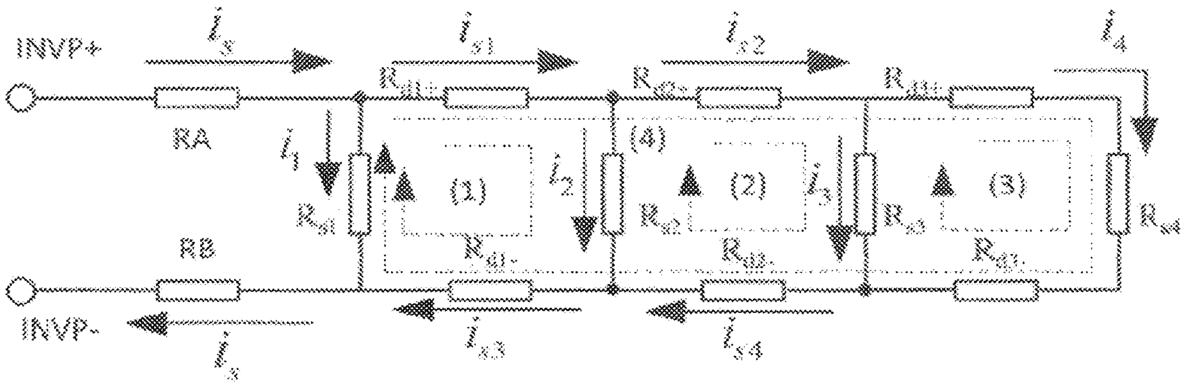
FIG. 2 PRIOR ART
FIG. 2 is a schematic diagram of battery packs connected in parallel according to the prior art.

FIG. 2 is a schematic diagram of battery packs connected in parallel according to the prior art. For example, there are four battery packs.

Resistors RA and RB have equivalent resistances of the connection terminal impedance and the wire impedance between positive and negative connection terminals of a charge/discharge apparatus and the battery packs connected in parallel. The impedances are the common connection impedance, which does not affect the internal of the battery pack parallel circuit, and thus can be ignored for current sharing.

$R_{s1}$ to $R_{s4}$ are a first cell internal resistance to a fourth cell internal resistance; $R_{d1+}$ to $R_{d3+}$ are a first positive equivalent resistance to a third positive equivalent resistance; $R_{d1-}$ to $R_{d3-}$ are a first negative equivalent resistance to a third negative equivalent resistance; $i_1$ to $i_4$ are a charge current of a first battery pack to a charge current of a fourth battery pack; and $i_{s1}$ to $i_{s4}$ are branch currents.

According to Kirchhoffs current theorem, the following can be obtained:

$$i_{s1}=i_{2+}i_3+i_4$$

$$i_{s3}=i_{2+}i_3+i_4$$

According to Kirchhoff s voltage theorem, the following can be obtained:

$$(i_{2+}i_3+i_4)\times R_{d1+}+i_2\times R_{s2}+(i_{2+}i_3+i_4)\times R_{d1-}=i_1\times R_{s1}$$

When current sharing is required on the battery packs, that is, when $i_1=i_2=i_3=i_4=i$, the following can be obtained:

$$R_{s1}-R_{s2}=3(R_{d1+}+R_{d1-})$$

When cell internal resistances of the battery packs are identical, that is, when $R_{s1}=R_{s2}$, the following can be obtained:

$$3(R_{d1+}+R_{d1-})=0$$

During practical application, $R_{d1+}>0$ and $R_{d1-}>0$. In this case, current sharing can be achieved only when the charge current is 0. Therefore, current sharing of the battery packs cannot be achieved during operation of the circuit.

Similarly, when $R_{s1}<R_{s2}$, the following can be obtained:

$$3(R_{d1+}+R_{d1-})<0$$

Since $R_{d1+}>0$ and $R_{d1}>0$, the circuit cannot achieve current sharing of the battery packs in this case.

Figure 3:
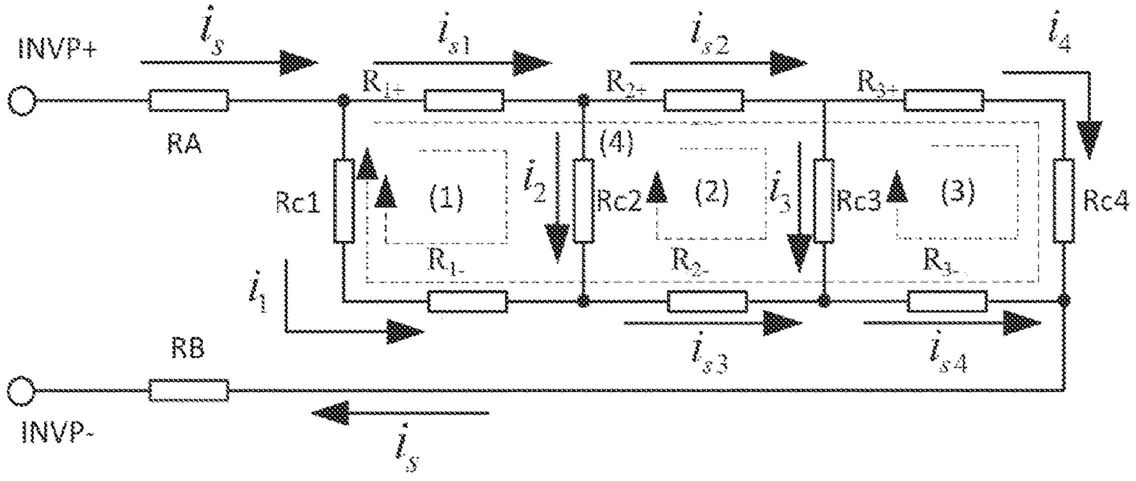
FIG. 3 is a schematic diagram of four battery packs connected in parallel in an embodiment of a battery pack parallel circuit according to the present disclosure.

FIG. 3 is a schematic diagram of four battery packs connected in parallel in this embodiment. Four battery packs are used as an example.

Resistors RA and RB have equivalent resistances of the connection terminal impedance and the wire impedance between positive and negative connection terminals of a charge/discharge apparatus and the battery packs connected in parallel.

$R_{c1}$ to $R_{c4}$ are a first cell internal resistance to a fourth cell internal resistance; $R_{1+}$ to $R_{3-}$ are a first positive equivalent resistance to a third positive equivalent resistance; $R_{1-}$ to $R_{3-}$ are a first negative equivalent resistance to a third negative equivalent resistance; $i_1$ to $i_4$ are a charge current of a first battery pack to a charge current of a fourth battery pack; and $i_{s1}$ to $i_{s4}$ are branch currents.

According to Kirchhoffs current theorem, the following can be obtained:

$$i_{s1}=i_{2+}i_3+i_4$$

According to Kirchhoffs voltage theorem, the following can be obtained:

$$(i_2+i_3+i_4)\times R_{1+}+i_2\times R_{c2}=i_1\times(R_{c1}+R_{1-})$$

When current sharing is required on the battery packs, that is, when $i_t=i_2=i_3=i_4=i$, the following can be obtained:

$$3\times R_{1+}+R_{c2}=R_{c1}+R_{1-}$$

When cell internal resistances of the battery packs are identical, that is, when $R_{c1}=R_{c2}$, the following can be obtained.

$$3\times R_{1+}=R_{1-}$$

When cell internal resistances of the battery packs are different, for example, when $R_{c1}<R_{c2}$, the following can be obtained:

$$3\times R_{1+}-R_{1-}<0$$

When $R_{c1}>R_{c2}$, the following can be obtained:

$$3\times R_{1+}-R_{1-}>0$$

That is, current sharing of the battery packs can be achieved by setting a ratio of $R_{1+}$ to $R_{1-}$.

It can be understood from FIG. 2 that in the prior art, in a single grid such as the first grid, the current directions of $R_{d1+}$, $R_{s2}$ and $R_{d1-}$ are clockwise, while the current direction of $R_{s1}$ is counterclockwise. Therefore, when a resistance ratio of $R_{s1}$ to $R_{s2}$ is fixed, current sharing of the battery packs cannot be achieved by adjusting $R_{d1+}$ and $R_{d1-}$ with the same current direction.

As can be seen from FIG. 3, in this embodiment, in a single grid such as the first grid, the current directions of $R_{1+}$ and $R_{c2}$ are clockwise, while the current directions of $R_{1-}$ and $R_{c1}$ are counterclockwise. Therefore, when a resistance ratio of $R_{c1}$ to $R_{c2}$ is fixed, current sharing of the battery packs can be achieved by adjusting $R_{1+}$ and $R_{1-}$ due to their opposite current directions.

Compared with the prior art, this embodiment is able to achieve current sharing of the battery packs in all cases. It should be noted that this embodiment only illustrates the case of four battery packs. The same applies to the case of other numbers of battery packs, and details are not described herein. This embodiment applies to the parallel current sharing of the battery packs in the charging state and the discharging state, and the current sharing calculation of the battery pack parallel circuit in the discharging state is the same as that in the charging state.

In this embodiment, the connection mode between the charge/discharge apparatus and the battery module is modified to enable the current to flow in from the positive terminal of the parallel battery packs and flow out from the farthest negative terminal on the diagonal, or enable the current to flow out from the positive terminal of the parallel battery packs and flow in from the farthest negative terminal on the diagonal, to adjust the parameters of the impedance devices with different current directions, such that parallel current sharing of the battery packs can be achieved by adjusting the impedance devices in the circuit.

Further, the battery module includes at least one resistor pair formed by a positive resistor and a negative resistor; the positive resistor has an equivalent resistance of a connection impedance between positive charge terminals of two adjacent battery packs, and the negative resistor has an equivalent resistance of a connection impedance between negative charge terminals of the two adjacent battery packs; and a resistance ratio of the positive resistor to the negative resistor in the resistor pair satisfies a battery pack current sharing condition.

The battery pack current sharing condition includes a requirement for setting the resistance ratio of the positive resistor to the negative resistor in the resistor pair to ensure current sharing of the battery packs under different cases.

As can be learned from the above description, this embodiment achieves current sharing of the battery packs in all cases. Specifically, this embodiment achieves current sharing of the battery packs by adjusting the resistance ratio of the positive resistor to the negative resistor in the resistor pair. The above description is used as an example again, that is, when there are four battery packs and current sharing is required on the battery packs:

When cell internal resistances of the battery packs are identical, the following can be obtained:

$$3\times R_{1+}=R_{1-}$$

It can be learned that the resistance ratio of the positive resistor to the negative resistor is ⅓ for achieving current sharing of the battery packs. The resistance ratio of the positive resistor to the negative resistor being ⅓ is a sub-condition of the battery pack current sharing condition.

This embodiment is used for example only, the resistance ratio of the positive resistor to the negative resistor in other cases can be calculated based on the actual circuit, and details are not described herein.

It can be seen from the above description that this embodiment achieves current sharing of the battery packs by setting the resistance ratio of the positive resistor to the negative resistor.

It should be noted that the resistance ratio of the positive resistor to the negative resistor can be calculated in advance based on the number of the battery packs and stored in the battery pack current sharing condition. During actual application, a corresponding resistance ratio is searched through matching in the battery pack current sharing condition based on the actual number of the battery packs. It should be noted that when setting the resistance ratio of the positive resistor to the negative resistor, the length and cross-sectional area of the corresponding wire can be adjusted to ensure that the resistance ratio of the positive resistor to the negative resistor satisfies the battery pack current sharing condition.

Further, if cell internal resistances of all of the plurality of battery packs connected in parallel are identical, a first resistance ratio of the positive resistor to the negative resistor in the resistor pair satisfies:

$$(N-i)R_{i+}=iR_{i-}$$

N is the number of the battery packs, i is a serial number of the resistor pair, a serial number of a resistor pair closest to a positive connection terminal of the charge/discharge apparatus is 1, $R_{i+}$ is the positive resistor, and $R_{i-}$ is the negative resistor.

Figure 4:
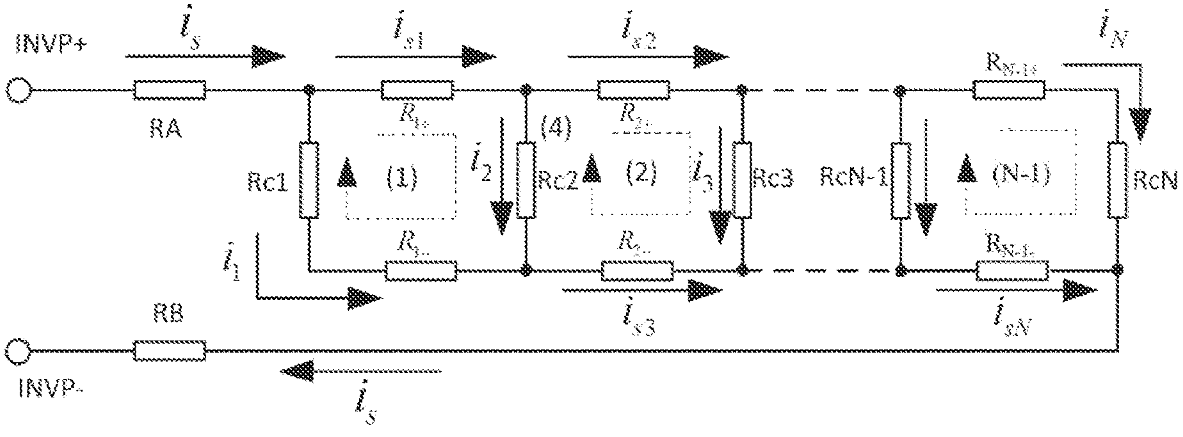
FIG. 4 is a schematic diagram of an indeterminate number of battery packs connected in parallel in an embodiment of a battery pack parallel circuit according to the present disclosure.

FIG. 4 is a schematic diagram of an indeterminate number of battery packs connected in parallel in this embodiment.

Resistors RA and RB have equivalent resistances of the connection terminal impedance and the wire impedance between positive and negative connection terminals of a charge/discharge apparatus and the battery packs connected in parallel.

$R_{c1}$ to $R_{cN}$ are a first cell internal resistance to an $N^{th}$ cell internal resistance; $R_{1+}$ to $R_{N-1+}$ are a first positive equivalent resistance to an $(N-1)^{th}$ positive equivalent resistance; $R_{1-}$ to $R_{N-1+}$ are a first negative equivalent resistance to an $(N-1)^{th}$ negative equivalent resistance; $i_1$ to $i_N$ are a charge current of a first battery pack to a charge current of an $N^{th}$ battery pack; and $i_{s1}$ to $i_{sN}$ are branch currents.

According to Kirchhoffs current theorem, the following can be obtained:

$$i_{s1}=i_{2+}i_3+\ldots+i_N$$

$$i_{s2}=i_3+i_4+\ldots+i_N$$

$$i_{s3}=i_1+i_2$$

$$i_{s4}=i_1+i_{2+}\ldots+i_{N-1}$$

When the cell internal resistances of all the battery packs are identical, according to Kirchhoffs voltage theorem, the following can be obtained The first grid:

$$(N-1)\times i\times R_{1+}+i\times Rc=i\times Rc+i\times R_{1-}$$

$$(N-1)\times R_{1+}=1\times R_{1-}$$

The second grid:

$$(N-2)\times i\times R_{2+}+i\times Rc=2\times i\times R_{2-}+i\times Rc$$

$$(N-2)\times R_{2+}=2\times R_{2-}$$

The $(N-1)^{th}$ grid:

$$i\times R_{N-1+}+i\times Rc=(N-1)\times i\times R_{N-1-}+i\times Rc$$

$$(N-(N-1))R_{N-1+}=(N-1)\times R_{N-1-}$$

It can be deduced based on the above equations that to achieve current sharing of the battery packs, the first resistance ratio of the positive resistor to the negative resistor in the resistor pair needs to satisfy:

$$(N-i)R_{i+}=iR_{1-}$$

Figure 5:
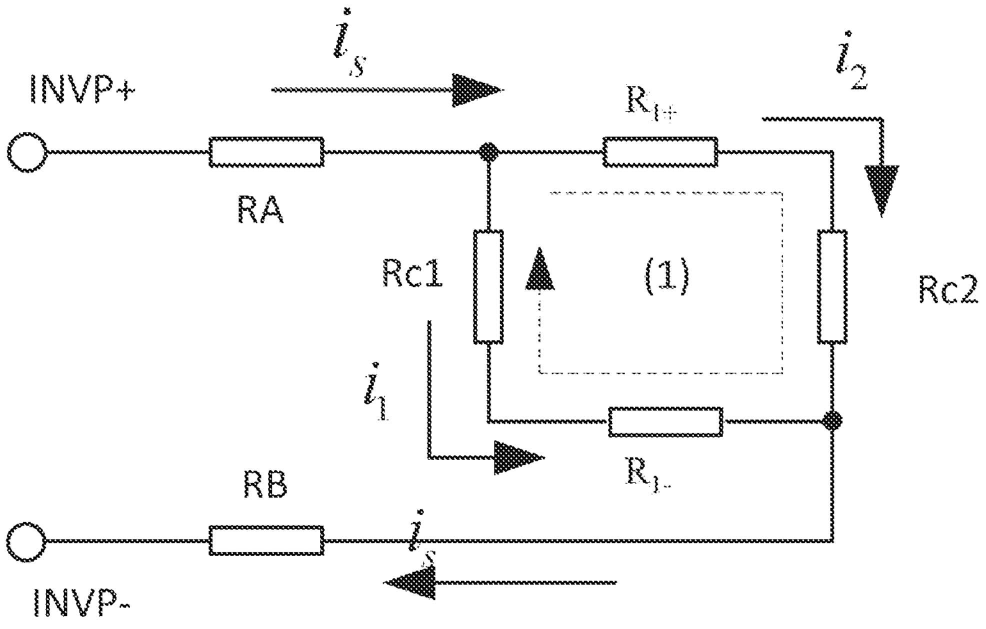
FIG. 5 is a schematic diagram of two battery packs connected in parallel in an embodiment of a battery pack parallel circuit according to the present disclosure.

To further explain this embodiment, the different cases are illustrated as follows:

1. Referring to FIG. 5, when there are two battery packs:

According to Kirchhoff's voltage theorem, the following can be obtained:

$$i_2(R_{1+}+R_{c2})=i_1(R_{1-}+R_{c1})$$

When the cell internal resistances of all the battery packs are identical, that is, when $R_{c1}=R_{c2}=R_c$, the following can be obtained:

$$i_2\times R_{1+}+i_2\times R_c=i_1\times R_{1-}+i_1\times R_c$$

When current sharing is required on the battery packs, that is, when $i_1=i_2=i$, the following can be obtained:

$$R_{1+}=R_{1-}$$

That is, when there are two battery packs, the battery pack current sharing condition is the resistance ratio of $R_{1+}$ to $R_{1-}$ being 1.

Figure 6:
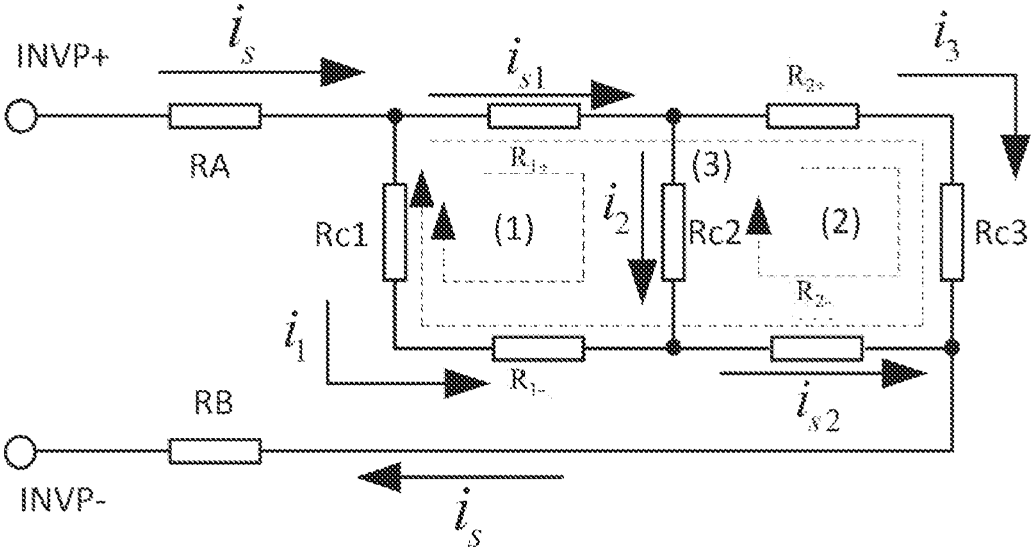
FIG. 6 is a schematic diagram of three battery packs in an embodiment of a battery pack parallel circuit according to the present disclosure.

2. Referring to FIG. 6, when there are three battery packs:

According to Kirchhoffs voltage theorem, the following can be obtained:

The first grid:

$$i_{s1}\times R_{1+}+i_2\times R_{c2}=i_1(R_{1-}+R_{c1})$$

The second grid:

$$i_3\times R_{2+}+i_3\times R_{c3}=i_{s2}\times R_{2-}+i_2\times R_{c2}$$

The last grid:

$$i_{s1}\times R_{1+}+i_3\times R_{2+}+i_3\times R_{c3}=i_{s2}\times R_{2-}+i_1\times(R_{c1}+R_{1-})$$

According to Kirchhoffs current theorem, the following can be obtained:

$$i_{s1}=i_{2+}i_3$$

$$i_{s2}=i_1+i_2$$

When the cell internal resistances of all the battery packs are identical, that is, when $R_{c1}=R_{c2}=R_{c3}=R_c$, and when current sharing is required on the battery packs, the following can be obtained:

The first grid:

$$2\times R_{1+}=R_{1-}$$

The second grid:

$$R_{2+}=2\times R_{2-}$$

The last grid:

$$2\times R_{1+}+R_{2+}=2\times R_{2-}+R_{1-}$$

That is, when there are three battery packs, the battery pack current sharing condition is the resistance ratio of $R_{1+}$ to $R_{1-}$ being ½, and the resistance ratio of $R_{2+}$ to $R_{2-}$ being 2/1.

3. Referring to FIG. 4, when there are four battery packs:

According to Kirchhoffs current theorem, the following can be obtained:

$$i_{s1}=i_2+i_3+i_4$$

$$i_{s2}=i_3+i_4$$

$$i_{s3}=i_1+i_2$$

$$i_{s4}=i_1+i_2+i_3$$

When the cell internal resistances of all the battery packs are identical, that is, when $R_{c1}=R_{c2}=R_{c3}=R_c$, and when current sharing is required on the battery packs, according to Kirchhoffs voltage theorem, the following can be obtained:

The first grid:

$$3\times R_{1+}=R_{1-}$$

The second grid:

$$R_{2+}=R_{2-}$$

The third grid:

$$R_{3+}=3\times R_{3-}$$

The last grid:

$$3\times R_{1+}+2\times R_{2+}+R_{3+}=R_{1-}+2\times R_{2-}+3\times R_{3-}$$

That is, when there are four battery packs, the battery pack current sharing condition is the resistance ratio of $R_{1+}$ to $R_{1-}$ being ⅓, the resistance ratio of $R_{2+}$ to $R_{2-}$ being 1, and the resistance ratio of $R_{3+}$ to $R_{3-}$ being 3/1.

Other cases can be calculated by analogy with reference to the above descriptions, and details are not described herein. It should be understood that only the resistance ratio of the positive resistor to the negative resistor is limited in this embodiment, but the specific resistances of the positive resistor and the negative resistor may be set based on the resistance ratio and actual application scenarios and needs.

This embodiment can accurately obtain the first resistance ratio of the positive resistor to the negative resistor in the resistor pair when the cell internal resistances of all the battery packs are identical.

Further, if a cell internal resistance of at least one battery pack is different from cell internal resistances of the other battery packs, the positive resistor and the negative resistor in the resistor pair satisfy a second resistance ratio, and the second resistance ratio is calculated based on the cell internal resistance of each of the battery packs.

When not all battery packs have the same cell internal resistance, the second resistance ratio of the positive resistor to the negative resistor is calculated based on Kirchhoff's voltage theorem and the actual cell internal resistance of each of the battery packs, to achieve current sharing of the battery packs.

Referring to FIG. 5 again, two battery packs are used as an example for description.

According to Kirchhoffs voltage theorem, the following can be obtained:

$$i_2(R_{1+}+R_{c2})=i_1(R_{1-}+R_{c1})$$

When current sharing is required on the battery packs, that is, when $i_1=i_2=i$, the following can be obtained:

$$R_{1+}+R_{c2}=R_{1-}+R_{c1}$$

When the cell internal resistances $R_{c1}$ and $Rc_{c2}$ of the battery packs are known, the resistance ratio of $R_{1+}$ to $R_{1-}$ can be obtained by substituting $R_{c1}$ and $R_{c2}$ into the above equations.

Referring to FIG. 6 again, three battery packs are used as an example for description:

According to Kirchhoffs voltage theorem, the following can be obtained:

The first grid:

$$i_{s1}\times R_{1+}+i_2\times R_{c2}=i_1(R_{1-}+R_{c1})$$

The second grid:

$$i_3\times R_{2+}+i_3\times R_{c3}=i_{s2}\times R_{2-}+i_2\times R_{c2}$$

The last grid:

$$i_{s1}\times R_{1+}+i_3\times R_{2+}+i_3\times R_{c3}=i_{s2}\times R_{2-}+i_1\times(R_{c1}+R_{1-})$$

According to Kirchhoffs current theorem, the following can be obtained:

$$i_{s1}=i_2+i_3$$

$$i_{s2}=i_1+i_2$$

When current sharing is required on the battery packs, that is, when $i_1=i_2=i_3=i$, the following can be obtained:

The first grid:

$$2R_{1+}+R_{c2}=R_{1-}+R_{c1}$$

The second grid:

$$R_{2+}+R_{c3}=R_{2-}+R_{c2}$$

The last grid:

$$R_{1+}+R_{2+}+R_{c3}=R_{2-}+R_{c1}+R_{1-}$$

When the cell internal resistances $R_{c1}$, $R_{c2}$ and $R_{c3}$ of the battery packs are known, the resistance ratio of $R_{1+}$ to $R_{1-}$ and the resistance ratio of $R_{2+}$ to $R_{2-}$ can be obtained by substituting $R_{c1}$, $R_{c2}$ and $R_{c3}$ into the above equations.

In this embodiment, only the examples of two battery packs and three battery packs are illustrated, and the second resistance ratio of the positive resistor to the negative resistor in other cases can be calculated by analogy, and details are not described herein.

This embodiment can accurately calculate the second resistance ratio of the positive resistor to the negative resistor in each resistor pair when the cell internal resistances of all the battery packs are not exactly identical.

Figure 7:
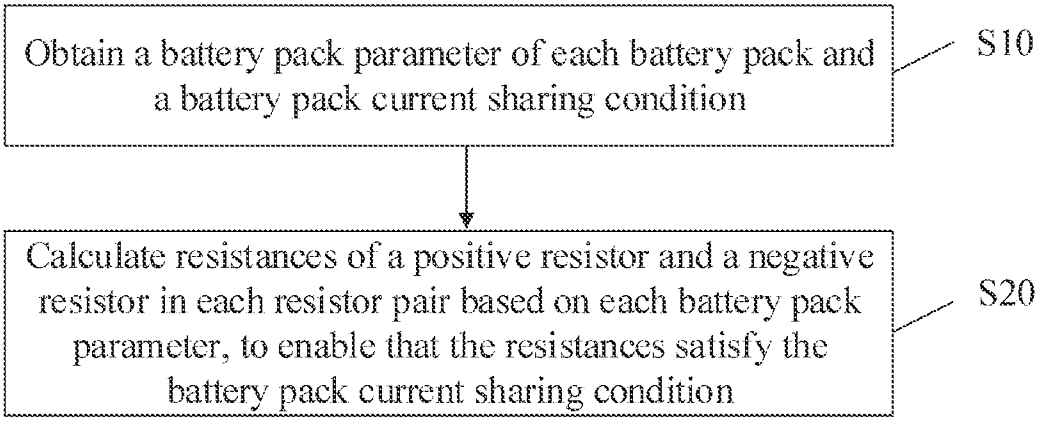
FIG. 7 is a flowchart of an embodiment of a design method for a battery pack parallel circuit according to the present disclosure.

Further, the present disclosure provides a design method for a battery pack parallel circuit. FIG. 7 is a flowchart of an embodiment of the design method for a battery pack parallel circuit according to the present disclosure. The method includes:

Step S10: A battery pack parameter of each battery pack and a battery pack current sharing condition are obtained.

The battery pack parameter includes a cell internal resistance of each battery pack. The battery pack current sharing condition includes a requirement for setting the resistance ratio of the positive resistor to the negative resistor in the resistor pair to ensure current sharing of the battery pack under different cases.

Step S20: Resistances of the positive resistor and the negative resistor in each resistor pair are calculated based on each battery pack parameter, to enable that the resistances satisfy the battery pack current sharing condition, where the positive resistor has an equivalent resistance of a connection impedance between positive charge terminals of two adjacent battery packs, and the negative resistor has an equivalent resistance of a connection impedance between negative charge terminals of the two adjacent battery packs.

The resistance ratio of the positive resistor to the negative resistor can be calculated in advance in different cases and stored in the battery pack current sharing condition. During actual application, a corresponding resistance ratio of the positive resistor to the negative resistor is searched through matching in the battery pack current sharing condition based on the corresponding case. It should be noted that when setting the resistance ratio of the positive resistor to the negative resistor, the length and cross-sectional area of the corresponding wire can be adjusted to ensure that the resistance ratio of the positive resistor to the negative resistor achieve the battery pack current sharing condition.

The method is applied to the battery pack parallel circuit. For the structure of the battery pack parallel circuit, refer to the above embodiments, and details are not described herein. The implementation process herein is the same as the above structure embodiments and can be performed with reference to the above embodiments.

Figure 8:
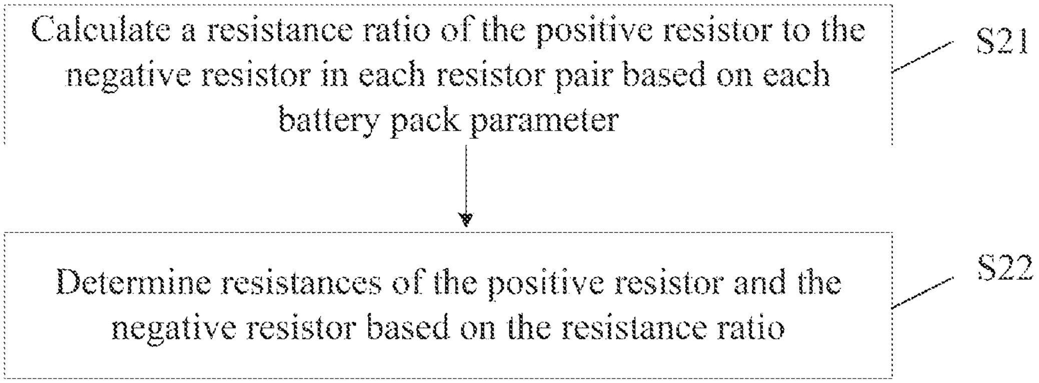
FIG. 8 is a flowchart of step S20 in an embodiment of a design method for a battery pack parallel circuit according to the present disclosure.

Further, referring to FIG. 8, the step S20 includes:

Step S21: A resistance ratio of the positive resistor to the negative resistor in each resistor pair is calculated based on each battery pack parameter.

Step S22: The resistances of the positive resistor and the negative resistor are determined based on the resistance ratio.

It can be learned from the above embodiments that current sharing of the battery packs can be achieved on the basis of the circuit by adjusting the resistance ratio of the positive resistor to the negative resistor. After calculating the resistance ratio of the positive resistor to the negative resistor, the specific resistances of the positive resistor and the negative resistor can be obtained with reference to the actual application scenarios and needs.

Further, the step S21 includes:

Step S211: A cell internal resistance of each battery pack is obtained from each battery pack parameter.

Step S212: Whether cell internal resistances of all the battery packs are identical is determined.

Step S213: If the cell internal resistances of all the battery packs are identical, it is determined that the resistance ratio of the positive resistor to the negative resistor in each resistor pair satisfies:

$$(N-i)R_{i+}=iR_{i-}$$

N is the number of the battery packs, i is a serial number of the resistor pair, a serial number of a resistor pair closest to a positive connection terminal of the charge/discharge apparatus is 1, $R_{i+}$ is the positive resistor, and $R_{i-}$ is the negative resistor.

After the step S212, the method further includes:

Step S214: The cell internal resistance of each battery pack is obtained if a cell internal resistance of at least one battery pack is different from cell internal resistances of the other battery packs.

Step S215: The resistance ratio of the positive resistor to the negative resistor in each resistor pair is calculated based on Kirchhoffs voltage theorem and the cell internal resistance of each battery pack.

For different cases in which the cell internal resistances of all the battery packs are or not identical, refer to the above descriptions of the circuit, and details are not described herein.

This embodiment can accurately obtain the resistance ratio of the positive resistor to the negative resistor in the resistor pair in different cases.

The present disclosure further provides a battery including a shell and a battery pack parallel circuit. For the structure of the battery pack parallel circuit, refer to the above embodiments, and details are not described herein. Certainly, since the battery of this embodiment adopts the technical solution of the above battery pack parallel circuit, the battery has all the beneficial effects of the above battery pack parallel circuit.

The present disclosure further provides a charge/discharge system, including a charge/discharge apparatus and a battery pack parallel circuit. For the structure of the battery pack parallel circuit, refer to the above embodiments, and details are not described herein. Certainly, since the charge/discharge system of this embodiment adopts the technical solution of the above battery pack parallel circuit, the charge/discharge system has all the beneficial effects of the above battery pack parallel circuit.

It should be noted that terms "including", "comprising" or any other variants thereof are intended to cover non-exclusive inclusions, such that a process, method, article or system including a series of elements includes not only those elements but also other elements not explicitly listed, or elements inherent to such a process, method, article or system. Without further limitation, an element qualified by the phrase "including a . . . " does not exclude the presence of an additional identical element in the process, method, article or system including the element. The serial numbers of the embodiments of the present disclosure are merely for description and do not represent a preference of the embodiments.

The above is merely a favorable embodiment of the present disclosure and does not constitute a limitation on the patent scope of the present disclosure. Any equivalent structure or equivalent process change made by using the specification and the drawings of the present disclosure, or direct or indirect application thereof in other related technical fields, should still fall in the protection scope of the patent of the present disclosure.

What is claimed is:

1. A battery pack parallel circuit, wherein the battery pack parallel circuit is connected to a charge/discharge apparatus, the battery pack parallel circuit comprises a battery module formed by a plurality of battery packs connected in parallel, and battery packs located at two ends of the battery module are a first end battery pack and a second end battery pack respectively; and a positive terminal of the first end battery pack is configured as a positive terminal of the battery pack parallel circuit and connected to a positive connection terminal of the charge/discharge apparatus, and a negative terminal of the second end battery pack is configured as a negative terminal of the battery pack parallel circuit and connected to a negative connection terminal of the charge/discharge apparatus;

wherein the battery module comprises at least one resistor pair formed by a positive resistor and a negative resistor; wherein the positive resistor has an equivalent resistance of a connection impedance between positive charge terminals of two adjacent battery packs, and the negative resistor has an equivalent resistance of a connection impedance between negative charge terminals of the two adjacent battery packs; and a resistance ratio of the positive resistor to the negative resistor in the resistor pair satisfies a battery pack current sharing condition.

2. The battery pack parallel circuit according to claim 1, wherein when cell internal resistances of all of the plurality of battery packs connected in parallel are identical, a first resistance ratio of the positive resistor to the negative resistor in the resistor pair satisfies:

wherein N is a number of the plurality of battery packs, i is a serial number of a resistor pair, a serial number of a resistor pair closest to the positive connection terminal of the charge/discharge apparatus is 1, is the positive resistor, and is the negative resistor.

3. The battery pack parallel circuit according to claim 1, wherein when a cell internal resistance of at least one battery pack is different from cell internal resistances of the other battery packs, the positive resistor and the negative resistor in the resistor pair satisfy a second resistance ratio, and the second resistance ratio is calculated based on Kirchhoff's voltage theorem and the cell internal resistance of each of the plurality of battery packs.

4. The battery pack parallel circuit according to claim 1, the charge/discharge apparatus comprises a charger, an inverter, or a converter.

5. A design method for a battery pack parallel circuit, applied to the battery pack parallel circuit according to claim 1, and comprising:

obtaining a battery pack parameter of each battery pack and a battery pack current sharing condition; and calculating resistances of a positive resistor and a negative resistor in each resistor pair based on each battery pack parameter, to enable that the resistances satisfy the battery pack current sharing condition, wherein the positive resistor has an equivalent resistance of a connection impedance between positive charge terminals of two adjacent battery packs, and the negative resistor has an equivalent resistance of a connection impedance between negative charge terminals of the two adjacent battery packs;

when setting the resistance ratio of the positive resistor to the negative resistor, the length and cross-sectional area of the corresponding wire are adjusted to ensure that the resistance ratio of the positive resistor to the negative resistor satisfies the battery pack current sharing condition.

6. The design method for the battery pack parallel circuit according to claim 5, wherein the step of calculating the resistances of the positive resistor and the negative resistor in each resistor pair based on each battery pack parameter comprises:

calculating a resistance ratio of the positive resistor to the negative resistor in each resistor pair based on each battery pack parameter; and determining the resistances of the positive resistor and the negative resistor based on the resistance ratio.

7. The design method for the battery pack parallel circuit according to claim 6, wherein the step of calculating the resistance ratio of the positive resistor to the negative resistor in each resistor pair based on each battery pack parameter comprises:

obtaining a cell internal resistance of each battery pack from each battery pack parameter;

determining whether cell internal resistances of all of the plurality of battery packs are identical; and when the cell internal resistances of all of the plurality of battery packs are identical, determining that the resistance ratio of the positive resistor to the negative resistor in each resistor pair satisfies:

wherein N is a number of the plurality of battery packs, i is a serial number of a resistor pair, a serial number of a resistor pair closest to a positive connection terminal of the charge/discharge apparatus is 1, is the positive resistor, and is the negative resistor.

8. The design method for the battery pack parallel circuit according to claim 7, wherein after the step of determining whether the cell internal resistances of all of the plurality of battery packs are identical, the design method further comprises:

obtaining the cell internal resistance of each battery pack when a cell internal resistance of at least one battery pack is different from cell internal resistances of the other battery packs; and calculating the resistance ratio of the positive resistor to the negative resistor in each resistor pair based on Kirchhoff's voltage theorem and the cell internal resistance of each battery pack.

9. The design method for the battery pack parallel circuit according to claim 5, wherein the battery pack current sharing condition comprises a resistance ratio of the positive resistor to the negative resistor, wherein the resistance ratio was calculated and stored in advance in different cases.

10. The design method for the battery pack parallel circuit according to claim 5, wherein in the battery pack parallel circuit, when cell internal resistances of all of the plurality of battery packs connected in parallel are identical, a first resistance ratio of the positive resistor to the negative resistor in the resistor pair satisfies:

wherein N is a number of the plurality of battery packs, i is a serial number of a resistor pair, a serial number of a resistor pair closest to the positive connection terminal of the charge/discharge apparatus is 1, is the positive resistor, and is the negative resistor.

11. The design method for the battery pack parallel circuit according to claim 5, wherein in the battery pack parallel circuit, when a cell internal resistance of at least one battery pack is different from cell internal resistances of the other battery packs, the positive resistor and the negative resistor in the resistor pair satisfy a second resistance ratio, and the second resistance ratio is calculated based on Kirchhoff's voltage theorem and the cell internal resistance of each of the plurality of battery packs.

12. A charge/discharge system, comprising a charge/discharge apparatus and the battery pack parallel circuit according to claim 1.

13. The charge/discharge system according to claim 12, wherein in the battery pack parallel circuit, when cell internal resistances of all of the plurality of battery packs connected in parallel are identical, a first resistance ratio of the positive resistor to the negative resistor in the resistor pair satisfies:

wherein N is a number of the plurality of battery packs, i is a serial number of a resistor pair, a serial number of a resistor pair closest to the positive connection terminal of the charge/discharge apparatus is 1, is the positive resistor, and is the negative resistor.

14. The charge/discharge system according to claim 12, wherein in the battery pack parallel circuit, when a cell internal resistance of at least one battery pack is different from cell internal resistances of the other battery packs, the positive resistor and the negative resistor in the resistor pair satisfy a second resistance ratio, and the second resistance ratio is calculated based on the cell internal resistance of each of the plurality of battery packs.

15. The charge/discharge system according to claim 12, wherein the charge/discharge apparatus comprises a charger, an inverter, or a converter.

16. The charge/discharge system according to claim 12, further comprising a shell, wherein the shell forms a battery with the battery pack parallel circuit, and the battery is connected to the charge/discharge apparatus.

* * * * *